April 27, 1965  A. E. BREWSTER  3,181,001
MAGNETIC TRIGGER DEVICES
Filed Sept. 17, 1959
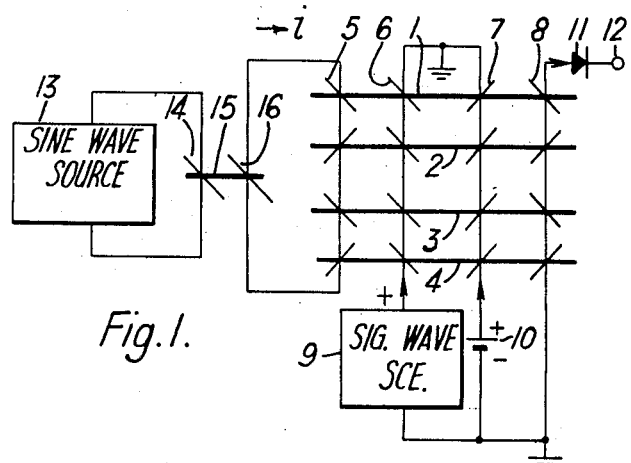
Fig. 1.
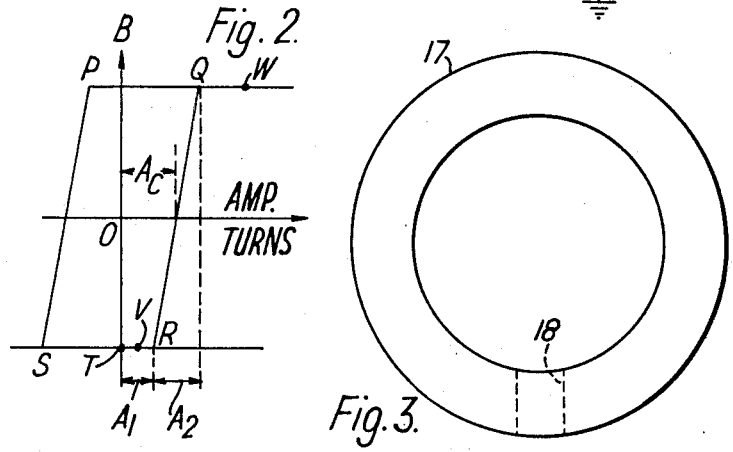
Fig. 2.
Fig. 3.
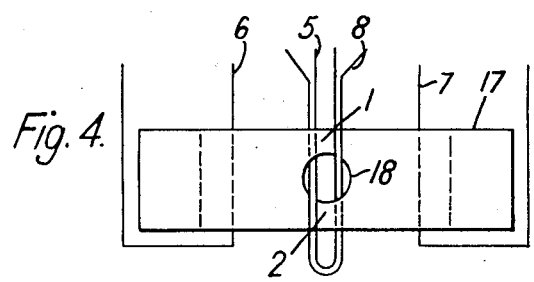
Fig. 4.
Inventor
A. E. BREWSTER
By C. K. Suydam
AGENT – # United States Patent Office 3,181,001
Patented Apr. 27, 1965

3,181,001
MAGNETIC TRIGGER DEVICES
Arthur Edward Brewster, London, England, assignor to International Standard Electric Corporation, New York, N.Y.
Filed Sept. 17, 1959, Ser. No. 840,770
Claims priority, application Great Britain, Nov. 13, 1958, 36,489/58
2 Claims. (Cl. 307—88)

The present invention relates to magnetic trigger devices such as are used, for example, in coding arrangements for electric pulse code modulation systems of communication.

In the particular example of a coder described in the specification of the copending application of A. E. Brewster, Serial No. 819,089, filed June 9, 1959, now Patent No. 3,136,981, the quantizing levels are determined by a group of magnetic cores, of saturable ferromagnetic material, preferably of ferrite material, with appropriate windings, one core corresponding to each level. The cores are all differently biased, and the signal wave to be coded is supplied to the windings on all the cores. The arrangement is such that all the cores are saturated except that one in which the flux due to the signal wave substantially cancels the bias flux. This core is the only one which can be triggered by an applied sampling wave, and the core bears output digit windings which generate the digit pulse combination appropriate to the corresponding signal level.

This arrangement operates quite satisfactorily so long as the variation of the signal wave amplitude during the period of a sampling pulse is small compared with the quantum amplitude difference. However, with some types of signal wave the amplitude variations may be so rapid that the duration of the sampling pulse must be reduced to an impracticably small value to fulfil this requirement. If this is not done, cores may be triggered at unwanted times by the signal wave alone, or the signal wave variation may cancel the effect of the sampling pulse so that no core is triggered at the sampling instant.

The object of the present invention is to prevent the signal wave from producing by itself unwanted outputs from the level determining cores, and to ensure that a core is always triggered at the sampling instant, so that the duration of the triggering pulses does not need to be reduced to impracticable values.

The manner in which this object is achieved according to the invention will be understood from the following detailed description with reference to the accompanying drawing, in which:

FIG. 1 shows a schematic circuit diagram of an embodiment of the invention;

FIG. 2 shows a hysteresis curve used to explain the operation of FIG. 1;

FIG. 3 shows a plan view of a toroidal core which provides the equivalent of two cores used in the embodiment of FIG. 1; and FIG. 4 shows a front view of the core shown in FIG. 3.

The operation of the embodiments of the invention depends on the use of triggering or switching pulses of defined volt-time product. The meaning of this term will be explained as follows:

Such triggering pulses are obtained from a winding on a saturable magnetic core which is triggered, or switched from one condition of saturation to the other, in some suitable way. The electromotive force $e$ generated in such a winding at any time is equal to $n.d\varphi/dt$, where $n$ is the number of turns of the winding, and $d\varphi/dt$ is the rate of change of the flux at that time. In the case of the ferromagnetic materials suitable for magnetic switching or storage devices, the rate of change of the flux is nearly constant during the period when the change of flux is taking place. Thus, approximately, $e=n\varphi/t$, where $\varphi$ is the total change of flux between the two conditions, and $t$ is the time taken for the change of flux to occur. So $et=n\varphi$. Now $\varphi$ is determined by the magnetic material, and $n$ is the number of turns of the winding, so the volt-time product $et$ of the output pulse is defined. If such a pulse is applied to a winding of $n$ turns on a second core of the same material, the circuit being assumed to have a negligible resistance, then this pulse is just able completely to switch over the second core before its energy is expended. If a different core material is used for the second core, in which the total flux change which occurs on switching over is $\varphi_1$, then the triggering pulse is just able to switch over the second core if the winding thereon has $n_1$ turns, where $n_1\varphi_1=n\varphi$.

The significance of this is that if the triggering pulse is applied to similar windings on several cores in series, and if the cores are so conditioned (for example, by appropriate biasing) that one of them starts to be switched before any of the others, then that core will be completely switched by the pulse, which will then have no energy left to switch any other core.

The object of the invention as stated above is achieved by the use of a pair of similar cores instead of a single core to define each amplitude level in the coder. The cores should be of a suitable saturatable ferromagnetic material, such as a ferrite material.

The arrangement is shown in FIG. 1, which shows two such pairs of cores for defining two adjacent amplitude levels, but it will be understood that there will be other pairs (not shown) which define the other amplitude levels. Cores 1 and 2 will be assumed to define the $m^{th}$ amplitude level, and cores 3 and 4 to define the $(m+1)^{th}$ amplitude level. These cores are represented diagrammatically as horizontal straight rods, though in practice they will preferably be toroids, or other closed magnetic circuits. The conventions explained in the specification referred to above will be adopted. Thus a short line sloping upwards to the left indicates a winding wound "straight" on a core while one which slopes to the right indicates a winding wound "reverse." A vertical line drawn through the intersection of a winding line with the core indicates a conductor with which the winding is in series. A current flowing downwards through a straight winding on a core will be assumed to produce a flux from left to right in the core.

Core No. 1 is provided with a sampling winding 5, a signal winding 6, a bias winding 7 and an output winding 8. Windings 5, 6 and 8 are wound straight, while winding 7 is wound reverse. Similar windings are provided on core No. 2, except that the sampling and output windings are wound reverse instead of straight. Cores 3 and 4 have similar windings to cores 1 and 2 respectively.

All the sampling windings 5 have the same number of turns, as do also all the signal windings 6, and all the output windings 8. Preferably all of these windings have one turn. The bias windings 7 on the cores 1 and 2 have $m$ turns (or a multiple thereof) while the bias windings 7 on the cores 3 and 4 have $m+1$ turns (or the same multiple thereof). The signal windings 6 are connected in series to a source 9 of a signal wave, while all the bias windings 7 are connected in series to a direct current bias source 10 which produces a bias flux from left to right in all the cores. The output windings 8 are connected in series with a rectifier 11 to an output terminal 12.

A source of sampling pulses of defined volt-time product comprises a sinewave source 13 of high impedance connected to an input winding 14 wound straight on a sampling core 15 similar to cores 1 to 4. This core has an output winding 16 connected to all the sampling windings 5 of all the cores 1 to 4 in a series loop circuit of negligible resistance.

The windings of all the other pairs of cores (not shown) are connected in series respectively with the corresponding windings of the cores 1 to 4.

The hysteresis loop PQRS shown in FIG. 2 represents that of the cores 1 and 2 in idealized form, but in this case the magnetic field is expressed in ampere-turns. If these cores are in a condition corresponding to the point T, the field which must be applied to bring the cores to the condition represented by the point R, when triggering just commences, is $A_1$, while the additional field necessary just to complete triggering, thus just taking the cores to the condition represented by the point Q, is $A_2$. It will be seen that $A_1 = A_c - \frac{1}{2}A_2$ where $A_c$ is the field corresponding to the coercivity of the magnetic material. The width of the hysteresis loop is $2A_c$.

The quantum difference between adjacent amplitude levels will be taken to correspond to the width of the loop $2A_c$. Thus the bias current supplied by the source 10 should be such that $2A_c = 1$ ampere-turn. Thus cores 1 and 2 will be biassed to the right in FIG. 2 with a field of $m$ ampere-turns. Let it be supposed that the signal amplitude is temporarily stationary and has a value which produces a field to the left between $m$ and $m+1$ ampere-turns. Then the condition of cores 1 and 2 is represented by some point such as V between R and S in FIG. 2. Since cores 3 and 4 have a bias of $m+1$ ampere-turns, the condition of these cores corresponds to a point such as W on the upper branch having an abscissa $2A_c$ greater than that of the point V.

The sinewave source 13 triggers the core 15 just after the amplitude of the sinewave changes sign. This produces an output pulse from the output winding having a defined volt-time product. As already explained, this pulse will be just able to trigger completely only one of the cores 1 to 4, and when that core is switched all the energy of the pulse has been used up so that no other core can be triggered. The current through the windings 5 increases until some core is brought to the condition represented by the point R (FIG. 2) and then that core only is triggered.

Let it be assumed that the sinewave source 13 produces a pulse $i$ of current which flows downwards through the windings 5 (FIG. 2). This pulse will aid the bias in cores 1 and 3, so the points V and W will be moved to the right. Point V reaches the corner R and the core 1 is triggered, producing a positive output pulse from winding 8. Core 3 will not be triggered because the point W is moved further away from the hysteresis loop. In the case of cores 2 and 4, the trigger windings 5 are wound reverse, so the triggering pulse $i$ will move the corresponding points V and W to the left. Core 2 cannot be triggered because V is moving the wrong way and core 4 cannot be triggered because the point W will not reach the triggering corner P before the energy of the triggering pulse has been used up in triggering core 1. Thus core 1 is the only one to be triggered, and produces the desired positive output pulse from terminal 12. It should be mentioned that all the other cores (not shown) are further from the triggering condition and none of them can be triggered, that is, assuming that the signal amplitude corresponds to a value lying between $m$ and $m+1$ ampere-turns.

Suppose that the signal amplitude is varying, then it will be seen that since the output windings 8 are in opposition on each pair of cores, no output will be produced at terminal 12 even if the variation should be such that the cores are triggered thereby. It will be seen that by this arrangement also, the signal wave source is not loaded either by the input circuit or by the output circuit.

The above explanation is modified when the signal amplitude has certain values near the boundary between two amplitude levels, such that a pair of cores is in a condition represented by a point on the line QR (FIG. 2). In that case the complete triggering of one of these cores does not use up the whole of the available ampere-turns of the triggering pulse, and one of the cores of each adjacent pair will also be partially triggered, so that the combined outputs of the triggered cores produce an output pulse of practically the same amplitude as before.

It should be pointed out that it is not essential that the triggering pulse should completely switch any core. If, for example, the windings 5 in FIG. 1 be given a larger number of turns than the winding 16, then the triggering pulse can only shift the condition of one of the cores to that corresponding to some point part of the way up the line RQ of FIG. 2, and the corresponding output pulse from winding 8 will be of smaller amplitude. This can, if necessary, be remedied by subsequent amplification. The advantage of switching the core only partially is that the power loss in the core is reduced, which may be of material importance, since sometimes the cores may tend to become overheated. It should be made clear, however, that while the triggering pulse may have a volt-time product less than that necessary to switch one core completely, this product should not be greater otherwise more than one core may be switched.

The arrangement described has another very valuable property which is connected with the case in which the signal amplitude is varying rapidly. Consider the point V (FIG. 2) corresponding to core No. 1 (FIG. 1). The triggering pulse tends to move V towards R, but if the signal amplitude is increasing rapidly, it may tend to move V towards S at the same or a greater rate, in which case the triggering pulse is not able to trigger core No. 1. However, in the case of core No. 4, the effects of the signal and the triggering pulse aid one another and the corresponding point W is moved to the left until it reaches P and core No. 4 is then triggered instead of core No. 1. This produces again a positive output pulse, since the winding 8 on core 4 is wound reverse. Thus it will be seen that when the signal amplitude is increasing rapidly, an output corresponding to the next higher level is produced.

It will be realized that if the signal amplitude is rapidly decreasing, the signal wave and the triggering pulse combine to move the point V to the right, so that core 1 is triggered, as before.

Thus it will be seen that this arrangement avoids the difficulty of the usual arrangement in which only one core is used to define each level whereby, if the signal amplitude is varying very rapidly, no core may be triggered, so that one or more whole code combinations are missed out. This objection can be overcome, when only one core per level is used, if the triggering pulses can be made short enough, but it is found that with some types of signal wave the triggering pulses have to be impracticably short.

It will be understood that the winding 8 on the cores shown in FIG. 1 may represent a digit winding, and that each core may be provided with more than one such digit winding according to the code.

The sinewave source 13 produces alternately positive and negative triggering pulses, which trigger the cores alternately in opposite directions. The negative triggering pulses will produce negative output pulses from the windings 8, which pulses are eliminated by the rectifier 11. If the circuits (not shown) to which terminal 12 is connected include means for eliminating the unwanted pulses, the rectifier 11 may be omitted.

It should be pointed out that the elimination of the unwanted negative pulses could be effected by conventional gating means (not shown) connected to the windings 8, and controlled by the source 13.

The cores 1 to 4 of FIG. 1 are preferably toroidal cores of ferrite material, but it is also possible to provide each pair of cores by means of a single toroid in the manner shown in FIGS. 3 and 4. The toroid 17 of suitable ferrite material has a radial hole 18 drilled or otherwise provided therethrough. The signal and bias windings comprise wires designated 6 and 7 in FIG. 4 linking the toroid as shown, and the triggering and output windings 5 and 8 comprise wires threaded through the hole 18. These are taken in parallel downwards through the hole 18 from the front to the inside of the toroid, then from the inside to the front under the toroid, and then through the hole 18 again from the front to the inside.

The hole 18 separates the magnetic circuit of the toroid locally into two portions corresponding respectively to the cores 1 and 2, and similarly designated in FIG. 4. It will be seen that the two magnetic circuits in FIG. 4 are oppositely linked by the windings 5 and 8, but similarly linked by the windings 6 and 7, and so the arrangement is equivalent to one pair of cores of FIG. 1. Although in FIG. 4 the bias winding 7 is shown with only one turn, it will be understood that it will generally have more than one turn, the number depending on the amplitude level to which the toroid corresponds.

It should be mentioned that the hole 18 shown in FIGS. 3 and 4 could alternatively be a hole parallel to the axis of the toroid instead of a radial hole.

While the principles of the invention have been described above in connection with specific embodiments, and particular modifications thereof, it is to be clearly understood that this description is made only by way of example and not as a limitation on the scope of the invention.

What I claim is:

1. A triggering circuit arrangement comprising:
 a single toroidal core of saturable ferromagnetic material having substantially rectangular hysteresis loop characteristic including
   a first aperture axially through said core, and a second aperture extending radially through said core from said first aperture to the outer periphery of said core to provide a pair of magnetic circuits in said core at least adjacent to said second aperture;
 a first electric circuit including
   a first winding threaded through said first aperture and wound about each of said magnetic circuits in a selected direction, and
   means to supply bias current to said first winding to produce an equal bias flux in a given direction in each of said magnetic circuits;
 a second electric circuit including
   a second winding threaded through said first aperture and wound about each of said magnetic circuits in a direction opposite to said selected direction, and
   means to supply a signal current of varying amplitude to said second winding to produce varying fluxes of equal magnitude in each of said magnetic circuits in a direction opposite to said given direction;
 a third electric circuit including
   a third winding threaded through said second aperture in a manner to be wound about one of said magnetic circuits in said selected direction and the other of said magnetic circuits in a direction opposite to said selected direction, and
   means to supply triggering pulses having at least a given polarity and a defined volt-time product not greater than a predetermined value to said third winding to produce a flux in said given direction in one of said magnetic circuits and an equal flux in a direction opposite to said given direction in the other of said magnetic circuits; and
 a third electric circuit including
   a fourth winding threaded through said second aperture in a manner to be wound about said one magnetic circuit in said selected direction and the other of said magnetic circuits in a direction opposite to said selected direction to produce output pulses having a predetermined amplitude and said given polarity in response to the reversal of the condition of saturation of either of said magnetic circuits by said triggering pulses of said given polarity.

2. A triggering circuit arrangement comprising:
 a single toroidal core of saturable ferromagnetic material having substantially rectangular hysteresis loop characteristics including
   a first aperture axially through said core, and
   a second aperture extending radially through said core from said first aperture to the outer periphery of said core to provide a pair of magnetic circuits in said core at least adjacent to said second aperture;
 a first electric circuit including
   a first winding threaded through said first aperture and wound about each of said magnetic circuits in a selected direction, and
   means to supply bias current to said first winding to produce an equal bias flux in a given direction in each of said magnetic circuits;
 a second electric circuit including
   a second winding threaded through said first aperture and wound about each of said magnetic circuits in a direction opposite to said selected direction, and
   means to supply a signal current of varying amplitude to said second winding to produce varying fluxes of equal magnitude in each of said magnetic circuits in a direction opposite to said given direction;
 a third electric circuit including
   a third winding threaded through said second aperture in a manner to be wound about one of said magnetic circuits in said selected direction and the other of said magnetic circuits in a direction opposite to said selected direction, and
   means to supply triggering pulses having first and second polarities and a defined volt-time product not greater than a predetermined value to said third winding to produce a flux in said given direction in one of said magnetic circuits and an equal flux in a direction opposite to said given direction in the other of said magnetic circuits; and
 a fourth electric circuit including
   a fourth winding threaded through said second aperture in a manner to be wound about said one magnetic circuit in said selected direction and the other of said magnetic circuit in a direction opposite to said selected direction to produce output pulses having a predetermined amplitude and said first polarity in response to the reversal of the condition of saturation of either of said magnetic circuits by said triggering pulses of said first polarity; and means coupled to said fourth winding to suppress output pulses produced by said triggering pulses by said second polarity.

References Cited by the Examiner
UNITED STATES PATENTS

| | | | |
|---|---|---|---|
| 2,818,554 | 12/57 | Chen et al. | 307—88 X |
| 2,834,004 | 5/58 | Canepa | 307—88 X |
| 2,913,596 | 11/59 | Ogle | 307—88 |
| 2,963,687 | 12/60 | Briggs | 307—88 X |
| 3,002,184 | 9/61 | Proebster | 307—88 X |
| 3,070,707 | 12/62 | Carter | 307—88 |
| 3,110,895 | 11/63 | Brewster | 307—88 X |

FOREIGN PATENTS 561,445   4/57   Italy.

IRVING L. SRAGOW, *Primary Examiner.*

EVERETT R. REYNOLDS, STEPHEN W. CAPELLI, *Examiners.*